United States Patent
Huh et al.

(10) Patent No.: US 7,567,639 B2
(45) Date of Patent: Jul. 28, 2009

(54) METHOD AND APPARATUS FOR GENERATING PREAMBLE SEQUENCE FOR ADAPTIVE ANTENNA SYSTEM IN ORTHOGONAL FREQUENCY DIVISION MULTIPLE ACCESS COMMUNICATION SYSTEM

(75) Inventors: Hoon Huh, Seongnam-si (KR); Jang-Hoon Yang, Seongnam-si (KR); Jae-Ho Jeon, Seongnam-si (KR); Soon-Young Yoon, Seoul (KR); Seung-Joo Maeng, Seongnam-si (KR); Jae-Hee Cho, Seoul (KR); In-Seok Hwang, Seoul (KR); Jee-Hyun Kim, Seongnam-si (KR); Kwan-Hee Roh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 607 days.

(21) Appl. No.: 11/116,904

(22) Filed: Apr. 28, 2005

(65) Prior Publication Data
US 2005/0243940 A1 Nov. 3, 2005

(30) Foreign Application Priority Data
Apr. 28, 2004 (KR) ...................... 10-2004-0029739

(51) Int. Cl.
*H04L 7/00* (2006.01)
(52) U.S. Cl. ........................ 375/365; 375/354; 375/353; 375/362
(58) Field of Classification Search .................. 375/352, 375/353, 354
See application file for complete search history.

(56) References Cited

U.S. PATENT DOCUMENTS

| 2002/0114355 | A1  | 8/2002  | Kim et al. |
| 2002/0118771 | A1* | 8/2002  | Larsson ...................... 375/267 |
| 2005/0169165 | A1* | 8/2005  | Cimini et al. ............... 370/206 |
| 2005/0180361 | A1* | 8/2005  | Hansen et al. .............. 370/334 |
| 2005/0195763 | A1* | 9/2005  | Kadous et al. .............. 370/328 |
| 2005/0226142 | A1* | 10/2005 | Moorti et al. ............... 370/208 |
| 2005/0249319 | A1* | 11/2005 | Suh et al. .................... 375/347 |
| 2005/0286474 | A1* | 12/2005 | van Zelst et al. ............ 370/334 |
| 2006/0085497 | A1* | 4/2006  | Sehitoglu .................... 708/405 |

(Continued)

FOREIGN PATENT DOCUMENTS
EP 1 018 827 7/2000

(Continued)

*Primary Examiner*—Shuwang Liu
*Assistant Examiner*—Kenneth Lam
(74) *Attorney, Agent, or Firm*—The Farrell Law Firm, LLP

(57) ABSTRACT

Disclosed is a method and an apparatus for generating a preamble sequence for an adaptive antenna system supporting a space division multiple access in an OFDMA communication system. Particularly, disclosed is a method for forming a preamble sequence identifying each of a plurality of mobile subscriber stations located within a cell or a sector of a communication system which includes a plurality of sub-channels assigned to the mobile subscriber stations, each of the sub-channels including a plurality of bins each of which includes n number of contiguous subcarriers in a frequency domain, the preamble sequence being transmitted before each of the sub-channels is transmitted, the method including the step of generating a preamble sequence by phase-shifting a predetermined sequence according to a predetermined phase shift sequence in the frequency domain.

3 Claims, 8 Drawing Sheets

U.S. PATENT DOCUMENTS

2007/0133386 A1* 6/2007 Kim et al. .................. 370/203

FOREIGN PATENT DOCUMENTS

| | | |
|---|---|---|
| EP | 1 061 705 | 12/2000 |
| EP | 1 185 001 | 3/2002 |
| JP | 2000-068973 | 3/2000 |
| RU | 2 123 763 | 12/1998 |
| RU | 2 191 479 | 10/2002 |
| WO | WO 01/05081 | 1/2001 |

* cited by examiner

8 DATA SUB-CARRIERS

1 PILOT SUB-CARRIER

| |
|---|
| $W_2(0)*PR(k*9+0)$ |
| $W_2(1)*PR(k*9+1)$ |
| $W_2(2)*PR(k*9+2)$ |
| $W_2(3)*PR(k*9+3)$ |
| Reserved |
| $W_2(4)*PR(k*9+5)$ |
| $W_2(5)*PR(k*9+6)$ |
| $W_2(6)*PR(k*9+7)$ |
| $W_2(7)*PR(k*9+8)$ |

| |
|---|
| $1 * PR(k*9+0)$ |
| $e^{j2\pi/9} * PR(k*9+1)$ |
| $e^{j4\pi/9} * PR(k*9+2)$ |
| $e^{j6\pi/9} * PR(k*9+3)$ |
| $e^{j8\pi/9} * PR(k*9+4)$ |
| $e^{j10\pi/9} * PR(k*9+5)$ |
| $e^{j12\pi/9} * PR(k*9+6)$ |
| $e^{j14\pi/9} * PR(k*9+7)$ |
| $e^{j16\pi/9} * PR(k*9+8)$ |

FIG.7

METHOD AND APPARATUS FOR GENERATING PREAMBLE SEQUENCE FOR ADAPTIVE ANTENNA SYSTEM IN ORTHOGONAL FREQUENCY DIVISION MULTIPLE ACCESS COMMUNICATION SYSTEM

PRIORITY

This application claims to the benefit under 35 U.S.C. 119(a) of an application entitled "Method And Apparatus For Generating Preamble Sequence For Adaptive Antenna System In Orthogonal Frequency Division Multiple Access Communication System" filed in the Korean Intellectual Property Office on Apr. 28, 2004 and assigned Serial No. 2004-29739, the contents of which are incorporated herein by reference.

BACKGROUND OF THE INVENTION

1. Field of the Invention

The present invention relates to an Orthogonal Frequency Division Multiple Access communication system (OFDMA communication system) employing an orthogonal frequency division multiple access scheme, and more particularly to a method and an apparatus for generating a preamble sequence for an adaptive antenna system (AAS) in an OFDMA communication system.

2. Description of the Related Art

Fourth generation (4G) communication systems (i.e., the next generation communication system) are being designed to provide users with services having various qualities of service (QoS) and supporting a transmission speed of about 100 Mbps. Particularly, in current 4G communication systems, research is being actively pursued to support a high speed service by ensuring mobility and QoS in broadband wireless access communication systems, such as a local area network (LAN) system and a metropolitan area network (MAN) system. A representative communication system currently under research is an Institute of Electrical and Electronics Engineers (IEEE) 802.16 communication system.

The IEEE 802.16 communication system employs an orthogonal frequency division multiplexing and orthogonal frequency division multiplexing access (OFDM/OFDMA) scheme in order to enable a physical channel of the wireless MAN system to support a broadband transmission network. The IEEE 802.16 communication system employs an orthogonal frequency division multiplexing scheme 'OFDM' and an orthogonal frequency division multiplexing access scheme (OFDMA) scheme in order to enable a physical channel of the wireless MAN system to support a broadband transmission network. The IEEE 802.16 communication system includes an IEEE 802.16d communication system and an IEEE 802.16e communication system. The IEEE 802.16d communication system considers only one state in which a subscriber station (SS) is currently motionless (i.e., one state in which the mobility of the SS is not entirely considered), and a signal cell structure. In contrast to the IEEE 802.16d communication system, the IEEE 802.16e communication system considers the mobility of an SS. Herein, for the convenience of explanation, a subscriber station with mobility is called a mobile subscriber station (MSS).

Meanwhile, the IEEE 802.16e communication system uses a multi-antenna scheme to expand the communication system's cell service area and also employs a space division multiple access (SDMA) scheme to increase the communication system's capacity. In order to employ the SDMA scheme, it is necessary to design preambles so that the channel quality information (CQI) of each MSS can be precisely measured. A base station minimizes interference between beams by using the correlation between the preambles and generates a precise beam with a channel state estimated according to each MSS, so that the base station can correctly decode data by preventing a signal of one MSS from interfering with signals of other MSSs.

Hereinafter, the construction of the IEEE 802.16e communication system employing the SDMA scheme will be described with reference to FIG. 1.

FIG. 1 is a diagram schematically illustrating the construction of a cellular system which employs a general SDMA scheme.

A base station 101 assigns the same frequency resource and time resource to MSSs (not shown) different from each other so that the MSSs may simultaneously use the same frequency resources and time resources in a first spatial channel transmitted through a first beam 102 and a second spatial channel transmitted through a second beam 103. In order to assign the same frequency resources and time resources to multiple MSSs as described above, it is necessary for the base station to form a plurality of beams spatially separated from each other.

Meanwhile, in order to form the beams as described above in downlinks, correct state information of uplink channels is required. Therefore, in a typical IEEE 802.16 OFDMA communication system, an AAS preamble sequence to support the AAS is added to each of downlink and uplink frames to be transmitted, so that it is possible to determine correct state information of downlink and uplink channels. FIG. 2 is a diagram schematically illustrating a frame structure of a general IEEE 802.16e OFDMA communication system.

The frame of the IEEE 802.16e OFDMA communication system is divided into a downlink frame 201 and an uplink frame 202. The downlink frame 201 includes a downlink preamble section, a frame control header (FCH) section, a downlink MAP (DL-MAP) section, an uplink MAP (UL-MAP) section, a plurality of AAS preamble sections, and a plurality of downlink burst (DL burst) sections (e.g., downlink burst section #1, downlink burst section #2, downlink burst section #3 and downlink burst section #4).

An downlink preamble section is an area for transmitting a synchronizing signal for synchronization acquisition between a transmitter and receiver (e.g., a base station and an MSS), that is, an area for transmitting a downlink preamble sequence. The FCH section is an area for transmitting basic information about a sub-channel, ranging, a modulation scheme, etc. The DL-MAP section is an area for transmitting a DL-MAP message and the UL-MAP section is an area for transmitting an UL-MAP message. Herein, information elements (IEs) included in the DL-MAP message and UL-MAP message have no direct relation to the present invention, so detailed description thereof is omitted. The AAS preamble sections are areas for transmitting a downlink AAS preamble sequence to support the AAS, and the downlink burst sections are areas for transmitting downlink data to target the MSSs.

The uplink frame 202 includes a plurality of AAS preamble sections and a plurality of uplink burst (UL burst) sections, that is, uplink burst section #1, uplink burst section #2, uplink burst section #3 and uplink burst section #4.

The AAS preamble sections in the uplink frame 202 are areas for transmitting an uplink AAS preamble sequence to support the AAS, and the uplink burst sections are areas for transmitting uplink data of the MSSs to target the base station.

Meanwhile, as shown in FIG. 2, an AAS preamble is transmitted at a stage previous to each of the DL bursts and UL bursts. The base station estimates an uplink channel state by using the downlink AAS preamble sequence and generates a downlink beam corresponding to the estimated uplink channel state.

However, in the current IEEE 802.16e communication system standard, distinct AAS preamble sequences for spatial channels different from each other (i.e., for beams different from each other) are not defined. Therefore, when a plurality of MSSs located at positions different from each other, each transmit the same preamble sequence by the same sub-carrier at the same time in an uplink, it is impossible for the base station to estimate a channel for each MSSs and generate a corresponding beam. That is, the conventional AAS preamble sequence cannot support the SDMA scheme in the OFDMA communication system. Therefore, it is desirable to develop a method in which distinct AAS preamble sequences are assigned to spatial channels different from each other and thus each receiving side of the AAS preamble sequences can distinguish the spatial channels to generate a beam.

SUMMARY OF THE INVENTION

Accordingly, the present invention has been made to solve the above-mentioned problems occurring in the prior art, and an object of the present invention is to provide an apparatus and a method for generating preamble sequences for an adaptive antenna system (AAS) in an OFDMA communication system.

Another object of the present invention is to provide an apparatus and a method for generating AAS preamble sequences which enable beams generated for transmission of distinct spatial channels to be distinguished from each other when the AAS supporting a space division multiple access (SDMA) scheme is used in the OFDMA communication system.

Still another object of the present invention is to provide an apparatus and a method for generating AAS preamble sequences by which sectors or a plurality of beams in a cell are distinguished, so that the SDMA scheme can be employed in the OFDMA communication system.

To accomplish these and other objects, in accordance with one aspect of the present invention, there is provided a method for forming a preamble sequence identifying each of a plurality of mobile subscriber stations located within a cell or a sector of a communication system which includes a plurality of sub-channels assigned to the mobile subscriber stations, each of the sub-channels including a plurality of bins each of which includes n number of contiguous subcarriers in a frequency domain, the preamble sequence being transmitted before each of the sub-channels is transmitted, the methods including the step of generating a preamble sequence by phase-shifting a predetermined sequence according to a predetermined phase shift sequence in the frequency domain.

In accordance with another aspect of the present invention, there is provided a method for forming a preamble sequence identifying each of a plurality of mobile subscriber stations located within a cell or a sector of a communication system which includes a plurality of sub-channels assigned to the mobile subscriber stations, each of the sub-channels including a plurality of bins each of which includes n number of contiguous subcarriers in a frequency domain, the preamble sequence being transmitted before each of the sub-channels is transmitted, the method including the step of generating a preamble sequence by cyclically shifting a predetermined sequence according to a predetermined time interval in a time domain.

In accordance with still another aspect of the present invention, there is provided a method for transmitting a resource through a spatial channel in a communication system which includes a plurality of bins in a frequency domain, each of bins including a predetermined number of contiguous data sub-carriers and one pilot sub-carrier, the method including the steps of generating a Walsh code based on a beam index according to the spatial channel and determining a position of a sub-carrier according to a cell identifier based on the Walsh code, the Walsh code having a predetermined length of an index equal to the beam index, generating a preamble sequence by multiplying a downlink preamble sequence transmitted through the contiguous data sub-carriers by the Walsh code, with respect to the data sub-carriers except for the position-determined sub-carrier, and spatially assigning the generated preamble sequence through the spatial channel to the mobile subscriber stations.

In accordance with still another aspect of the present invention, there is provided an apparatus for forming a preamble sequence identifying each of a plurality of mobile subscriber stations located within a cell or a sector of a communication system which includes a plurality of sub-channels assigned to the mobile subscriber stations, each of the sub-channels including a plurality of bins each of which includes n number of contiguous subcarriers in a frequency domain, the preamble sequence being transmitted before each of the sub-channels is transmitted, the apparatus including a preamble sequence generator for generating a preamble sequence by phase-shifting a predetermined sequence according to a predetermined phase shift sequence in the frequency domain.

In accordance with still another aspect of the present invention, there is provided an apparatus for forming a preamble sequence identifying each of a plurality of mobile subscriber stations located within a cell or a sector of a communication system which includes a plurality of sub-channels assigned to the mobile subscriber stations, each of the sub-channels including a plurality of bins each of which includes n number of contiguous subcarriers in a frequency domain, the preamble sequence being transmitted before each of the sub-channels is transmitted, the apparatus including a preamble sequence generator for generating a preamble sequence by cyclically shifting a predetermined sequence according to a predetermined time interval in a time domain.

In accordance with still another aspect of the present invention, there is provided an apparatus for assigning a resource through a spatial channel in a communication system which includes a plurality of bins in a frequency domain, each of bins including a predetermined number of contiguous data sub-carriers and one pilot sub-carrier, the apparatus including a preamble sequence generator for determining a position of a reserved sub-carrier corresponding to a structure of the bin, and generating a preamble sequence by multiplying an input data bit by a Walsh code selected by a beam index.

BRIEF DESCRIPTION OF THE DRAWINGS

The above and other objects, features and advantages of the present invention will be more apparent from the following detailed description taken in conjunction with the accompanying drawings, in which:

FIG. 7 is a diagram schematically illustrating a structure of an AAS preamble sequence according to a second embodiment of the present invention;

DETAILED DESCRIPTION OF THE PREFERRED EMBODIMENT

Hereinafter, preferred embodiments according to the present invention will be described with reference to the accompanying drawings. In the following description of the embodiments of the present invention, a detailed description of known functions and configurations incorporated herein will be omitted when it may obscure the subject matter of the present invention.

The present invention provides an apparatus and a method for generating preamble sequences for an adaptive antenna system (AAS) which can support a space division multiple access (SDMA) scheme in an Orthogonal Frequency Division Multiple Access (OFDMA) communication system (OFDMA communication system) employing an orthogonal frequency division multiple access (OFDMA) scheme, such as, for example, an IEEE (Institute of Electrical and Electronics Engineers) 802.16e communication system.

Although the present invention will be described in relation to the IEEE 802.16e communication system for convenience of description, the apparatus and the method for generating preamble sequences (AAS preamble sequences) for the AAS proposed in the present invention may be applicable to other systems employing the OFDMA scheme or to other communication systems employing other suitable communication schemes.

In allocating resources for the AAS structure of the IEEE 802.16e communication system, one bin is assigned to each of mobile subscriber stations (MSSs). Herein, the bin implies that nine sub-carriers are occupied by one OFDM symbol. Therefore, the AAS preamble sequences according to the present invention are mapped onto nine sub-carriers according to the bin structure.

Figures 3, 4:
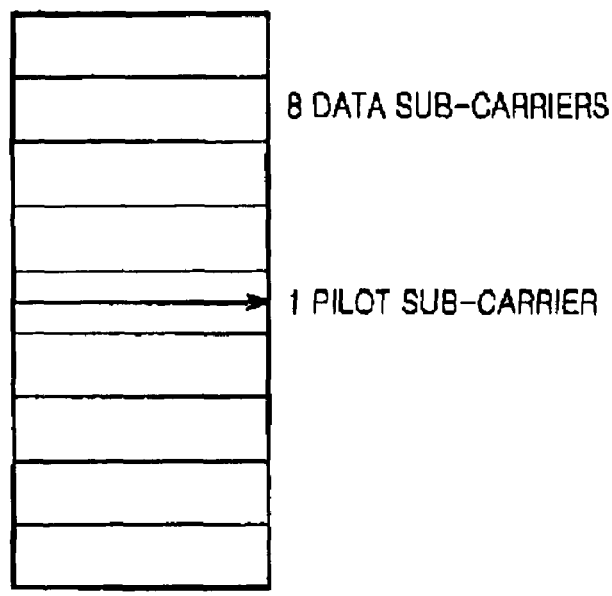
FIG. 3 is a diagram schematically illustrating a bin structure in a general IEEE 802.16 communication system.
FIG. 4 is a diagram schematically illustrating a structure of an AAS preamble sequence according to a first embodiment of the present invention.

FIG. 3 is a diagram schematically illustrating a bin structure in a general IEEE 802.16e OFDMA communication system.

A bin includes eight data sub-carriers and one pilot sub-carrier, thereby including a total of nine sub-carriers. In this case, the pilot sub-carrier is located in the center of the bin. Also, six bins forms one sub-channel.

Figure 1:
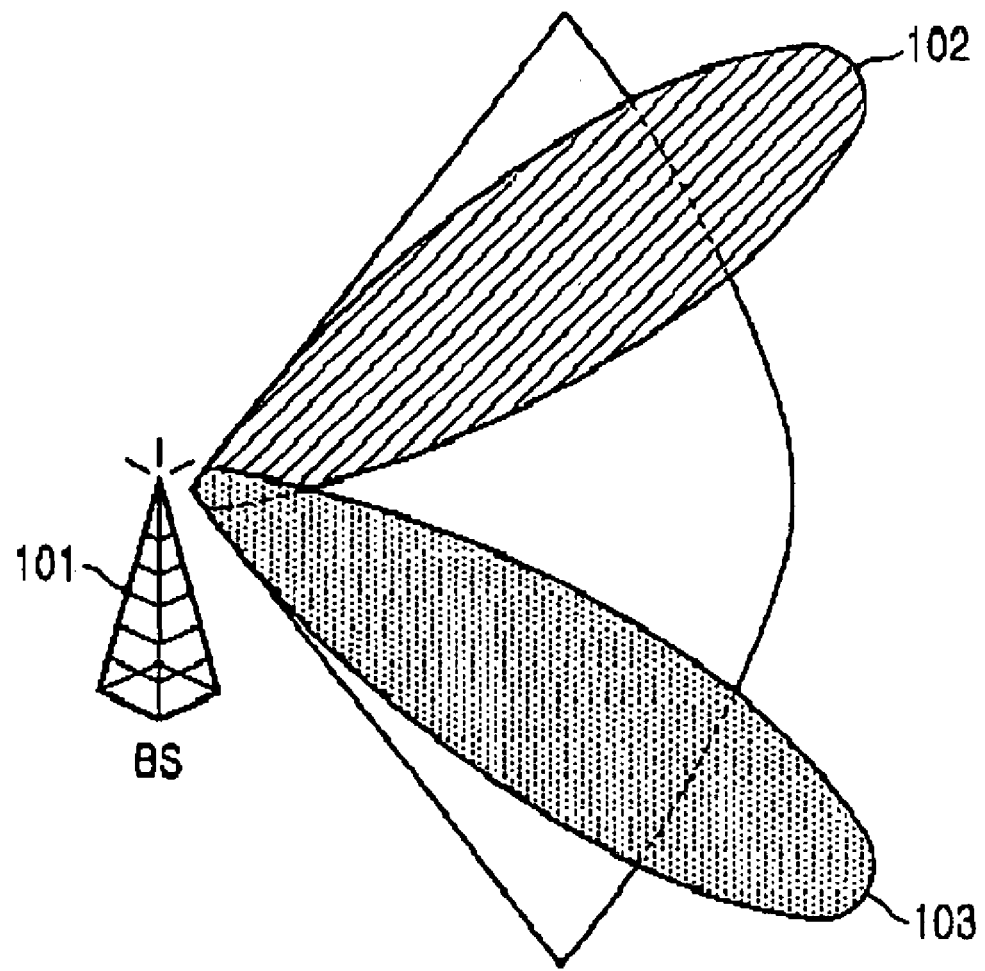
FIG. 1 is a diagram schematically illustrating the construction of an IEEE 802.16 communication system employing a general space division multiple access (SDMA) scheme.
Figure 2:
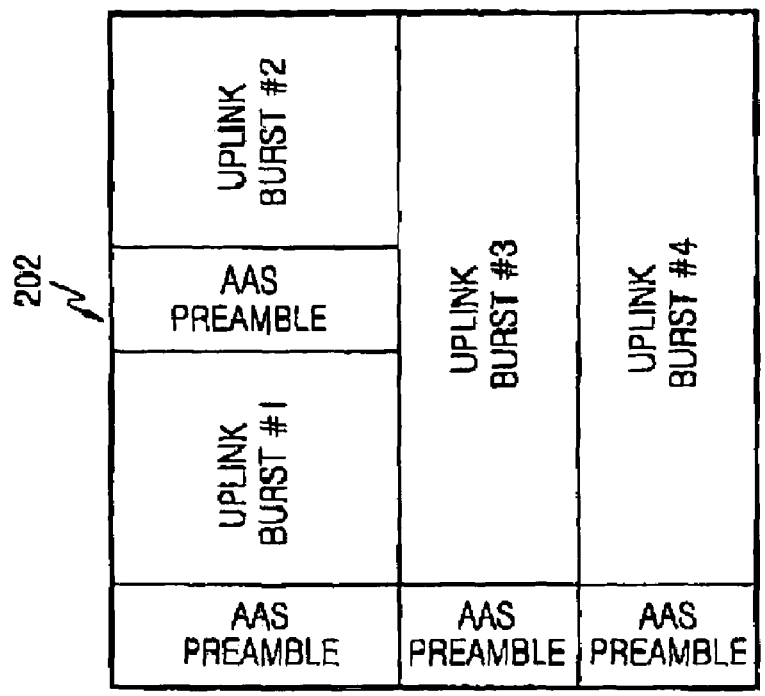
FIG. 2 is a diagram schematically illustrating a frame structure of a general IEEE 802.16 communication system.
Figure 2:
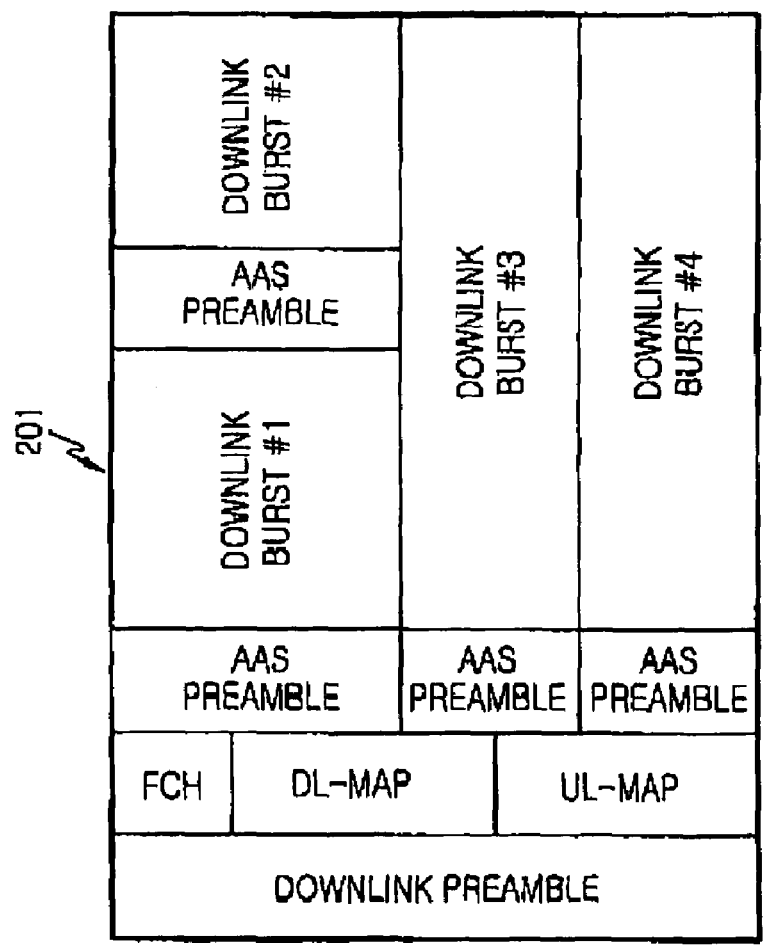

Meanwhile, as described above with reference to FIG. 2, each of downlink bursts (DL bursts) and uplink bursts (UL bursts) in the IEEE 802.16e communication system includes a plurality of sub-carriers. An AAS preamble sequence of one OFDM symbol length, which is defined in the same sub-carrier as that of each of the DL bursts and UL bursts, is inserted into the front portion of a corresponding DL burst or UL burst, and then the DL burst or UL burst is transmitted. In allocating resources for the structure of a sub-channel for the AAS and AMC (Adaptive Modulation and Coding) of the OFDMA system, one bin having a size of "nine sub-carriers× one symbol" is allocated to each of MSSs. Here, as described above, the size of the bin (nine sub-carriers×one symbol) implies that the nine sub-carriers are occupied by one OFDM symbol. In the following description, the basic unit of the AAS preamble sequence is nine sub-carriers and is arranged in the bin in a frequency range.

FIG. 4 is a diagram schematically illustrating the structure of an AAS preamble sequence according to a first embodiment of the present invention.

As described above, the AAS preamble sequence includes nine sub-carriers, that is, eight AAS preamble sub-carriers and one reserved sub-carrier. In this case, no signal is transmitted through the reserved sub-carrier. The eight AAS preamble sub-carriers carriers a signal obtained by multiplying the existing downlink preamble signal, which is carried by the eight AAS preamble sub-carriers, by an 8-ary Walsh code.

In FIG. 4, "$W_k(n)$" represents an $n^{th}$ signal of a Walsh code corresponding a $k^{th}$ index, and "PR(n)" represents an $n^{th}$ sub-carrier of the existing downlink preamble sequence. In this case, the code index of the Walsh code is determined from a spatial channel index. Therefore, there may be a total of eight spatial channels.

Meanwhile, the position of the reserved sub-carrier in the AAS preamble sequence can be expressed as shown in Equation 1.

$$\text{Reserved\_Subcarrier\_Position}=\text{mod}(\text{Cell\_ID}, 9) \quad \text{Equation 1}$$

Herein, "Cell_ID" represents an identifier (ID) assigned to a corresponding cell. The position of the reserved sub-carrier changes depending on cells by a modulo operation of the identifier on nine. It is possible to reduce the interference between cells by changing the position of the reserved sub-carrier according to cells as described above. In addition, it is possible to measure the magnitude of the interference between cells at the position of the reserved sub-carrier.

Figure 5:
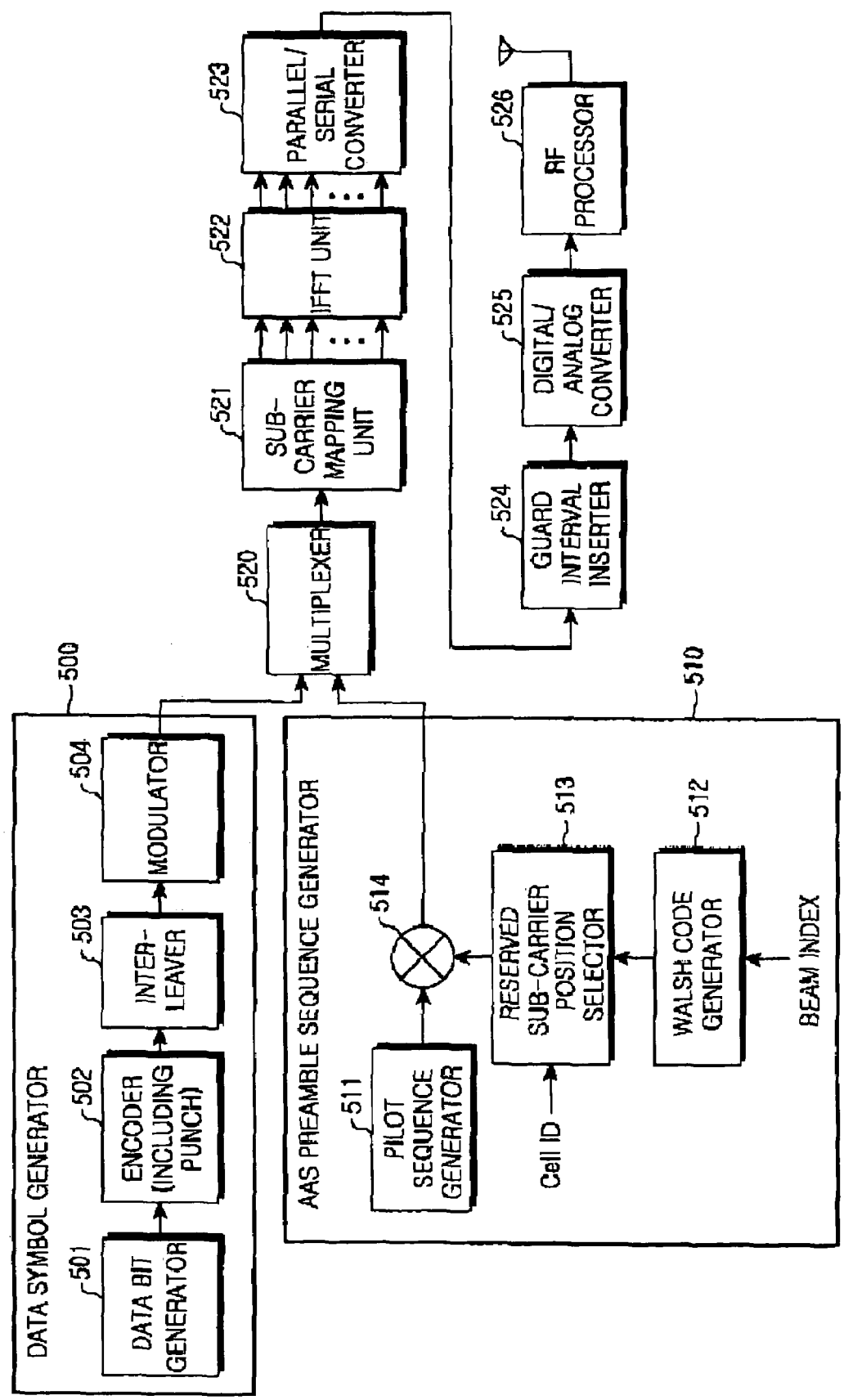
FIG. 5 is a block diagram illustrating the construction of a transmitter for performing an AAS preamble sequence generation function in the IEEE 802.16 communication system according to the first embodiment of the present invention.

FIG. 5 is a block diagram illustrating the construction of a transmitter for performing an AAS preamble sequence generation function in the IEEE 802.16e communication system according to the first embodiment of the present invention.

The transmitter includes a data symbol generator 500, an AAS preamble sequence generator 510, a multiplexer 520, a sub-carrier mapping unit 521, an inverse fast Fourier transform (IFFT) unit 522, a parallel-to-serial converter 523, a guard interval inserter 524, a digital-to-analog converter 525, and a radio frequency (RF) processor 526.

The data symbol generator 500 includes a data bit generator 501, an encoder 502, an interleaver 503, and a modulator 504. The AAS preamble sequence generator 510 includes a pilot sequence generator 511, a Walsh code generator 512, a reserved sub-carrier position selector 513, and a multiplier 514.

First, when information bits to be transmitted are generated, the data bit generator 501 outputs the information bits to the encoder 502. The encoder 502 receives the information bits output from the data bit generator 501, encodes the received information bits according to a predetermined coding scheme, and then outputs the encoded information bits to the interleaver 503. Herein, the coding scheme includes a convolutional coding scheme, a turbo coding scheme having a predetermined coding rate, etc. The interleaver 503 receives the signal output from the encoder 502, performs an interleaving operation with respect to the received signal, and then outputs the interleaved signal to the modulator 504. The modulator 504 receives the signal output from the interleaver 503, modulates the received signal according to a predetermined modulating scheme to generate a modulated symbol, and then outputs the modulated symbol to the multiplexer 520.

Meanwhile, the pilot sequence generator 511 generates a pilot sequence corresponding to a predetermined cell identifier, and then outputs the generated pilot sequence to the multiplier 514. Herein, the pilot sequence generator 511 operates to generate a pilot sequence in the same scheme as that described above, so detailed description thereof is omitted. The Walsh code generator 512 generates a Walsh code selected by a beam index which is given according to system set up, and then outputs the generated Walsh code to the reserved sub-carrier position selector 513. The reserved sub-carrier position selector 513 selects a position of the generated Walsh code to correspond to a given bin structure, and outputs the selected information to the multiplier 514. Herein, the reserved sub-carrier position selector 513 selects a position of the reserved sub-carrier varied depending on each cell, by a modulo operation of a cell identifier on the number of sub-carriers in relation to the cell identifier as described with reference to Equation 1, thereby reducing interference between cells.

The multiplier 514 multiplies the pilot sequence generated from the pilot sequence generator 511 by the Walsh code output from the reserved sub-carrier position selector 513, and outputs a resultant signal to the multiplexer 520.

The multiplexer 520 multiplexes the signal output from the modulator 504 and the signal output from the multiplier 514 according to scheduling at each time point, and outputs the resultant signal to the sub-carrier mapping unit 521. The sub-carrier mapping unit 521 receives the signal output from the multiplexer 520, maps the received signal onto corresponding sub-carriers, and then outputs the resultant signal to the IFFT unit 522. The IFFT unit 522 receives the signal output from the sub-carrier mapping unit 521, performs the IFFT for the received signal, and then outputs the resultant signal to the parallel-to-serial converter 523. The parallel-to-serial converter 523 converts the signal output from the IFFT unit 522 into a serial signal and then outputs the serial signal to the guard interval inserter 524.

The guard interval inserter 524 inserts a guard interval signal into the serial signal output from the parallel-to-serial converter 523, and outputs the resultant signal to the digital-to-analog converter 525. Herein, the guard interval is inserted to remove interference between a previous OFDM symbol transmitted at a previous OFDM symbol time and a current OFDM symbol to be transmitted a current OFDM symbol time when an OFDM symbol is transmitted in the OFDM communication system. Also, the guard interval is inserted in one of a cyclic prefix scheme and a cyclic postfix scheme. According to the cyclic prefix scheme, a predetermined number of last samples of an OFDM symbol in a time domain are copied and inserted into a valid OFDM symbol. According to the cyclic postfix scheme, a predetermined number of first samples of an OFDM symbol in a time domain are copied and inserted into a valid OFDM symbol.

The digital-to-analog converter 525 receives the signal output from the guard interval inserter 524, converts the received signal into an analog signal, and then outputs the analog signal to the RF processor 526. Herein, the RF processor 526 includes a filter, a front-end unit, etc. The RF processor 526 RF-processes the analog signal output from the digital-to-analog converter 525 so that the signal can be transmitted over the air, and then outputs the RF-processed signal over the air via a transmission (Tx) antenna.

In short, a data bit is generated by the data symbol generator 500 and an AAS preamble sequence is generated by the AAS preamble sequence generator 510. Herein, the AAS preamble sequence is generated by multiplying a Walsh code, which is selected by a beam index, by a sequence generated by the same scheme as the conventional preamble sequence generation scheme. In this case, a position of a reserved sub-carrier is selected to correspond to a bin structure by the reserved sub-carrier position selector 513. Thereafter, the data bit and the AAS preamble sequence passes through the multiplexer 520, are mapped according to a sub-carrier assignment rule in the sub-carrier mapping unit 521, and then are OFDM-modulated to be transmitted.

Figure 6:
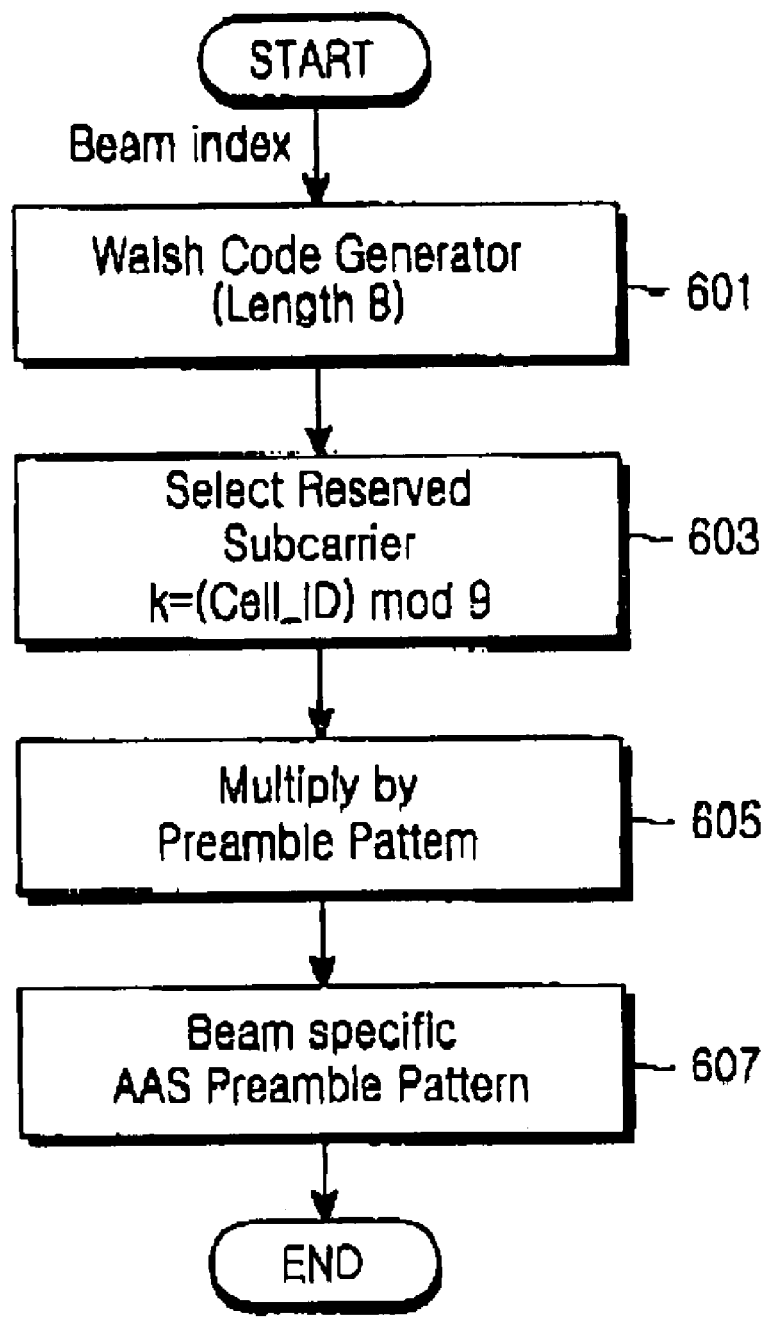
FIG. 6 is a flowchart illustrating a procedure for generating an AAS preamble sequence according to the first embodiment of the present invention.

FIG. 6 is a flowchart illustrating a procedure for generating an AAS preamble sequence in the AAS preamble sequence generator shown in FIG. 5 according to the first embodiment of the present invention.

First, the AAS preamble sequence generator 510 generates an 8-ary Walsh code corresponding to a beam index according to a given spatial channel in step 601, and then proceeds to step 603. In step 603, a position of a reserved sub-carrier is selected according to a base station number, i.e., a cell identifier (Cell_ID) assigned to the base station, corresponding to the generated Walsh code, and then step 605 is performed. In step 605, when the position of the reserved sub-carrier has been determined through the selecting step, an existing downlink preamble sequence and the generated 8-ary Walsh code are multiplied together with respect to sub-carriers except for the reserved sub-carrier, then the resultant signal is output. In this case, no signal is transmitted through a sub-carrier corresponding to a "Reserved_Subcarrier_Position", so power assigned to this sub-carrier can be used to the power of other sub-carriers.

The "Reserved_Subcarrier_Position" is determined according to a cell identifier (Cell_ID) assigned to a corresponding base station. As used herein, the "Reserved_Subcarrier_Position" is defined as a remainder obtained by dividing the cell identifier by nine. Such a structure reduces interference between sub-carriers in a preamble with respect to nine sub-carrier domains when cells are properly arranged.

Hereinafter, an AAS preamble sequence and an apparatus and a method for generating the AAS preamble sequence according to a second embodiment of the present invention will be described with reference to FIGS. 7 to 9.

According to the second embodiment of the present invention, an AAS preamble sequence is defined for every spatial channel, that is, distinct sequences are defined for beams different from each other. Also, the AAS preamble sequence is generated by scrambling a sequence (e.g., a discrete Fourier transform sequence) having an orthogonal property to a downlink preamble sequence, that is, having high correlation with the downlink preamble sequence.

FIG. 7 is a diagram schematically illustrating the structure of an AAS preamble sequence according to the second embodiment of the present invention. As described above, the AAS preamble sequence according to the second embodiment of the present invention is generated to be mapped onto nine sub-carriers, that is, nine AAS preamble sub-carriers.

Also, the nine AAS preamble sub-carriers carry a signal, which is obtained by multiplying the existing downlink preamble signal carried by these sub-carriers by an orthogonal sequence of length "ine" generated through a 9-point discrete Fourier transform (DFT) operation. The signal obtained through the multiplication by the orthogonal sequence is one-to-one mapped onto sequences obtained by multiplying a cell identifier (Cell ID) by a downlink preamble sequence selected corresponding to a sector identifier (sector ID). Herein, a 9-point DFT-based orthogonal sequence is obtained by randomly selecting one row within a 9×9 DFT matrix shown in Equation 2.

$$\begin{bmatrix} 1 & 1 & 1 & \ldots & 1 \\ 1 & e^{j\frac{2\pi}{9}} & e^{j\frac{2\pi \cdot 2}{9}} & \ldots & e^{j\frac{2\pi \cdot 8}{9}} \\ 1 & e^{j\frac{4\pi}{9}} & e^{j\frac{4\pi \cdot 2}{9}} & \ldots & e^{j\frac{4\pi \cdot 8}{9}} \\ \vdots & \vdots & \vdots & \ddots & \vdots \\ 1 & e^{j\frac{16\pi}{9}} & e^{j\frac{16\pi \cdot 2}{9}} & \ldots & e^{j\frac{16\pi \cdot 8}{9}} \end{bmatrix} \quad \text{Equation 2}$$

Herein, a 9-point DFT-based orthogonal sequence "$S_k$" corresponding to a $k^{th}$ index can be expressed as shown in Equation 3.

$$S_k = [1 \; e^{j2\pi k/9} \; e^{j4\pi k/9} \; e^{j6\pi k/9} \; e^{j8\pi k/9} \; e^{j10\pi k/9} \; e^{j12\pi k/9} \; e^{j14\pi k/9} \; e^{j16\pi k/9}] \quad 3$$

Herein, a sequence index of a 9-point DFT-based orthogonal sequence "$S_k$" is determined from a spatial channel index, which means that a total of nine spatial channels can exist.

The FIG. 7 shows an example in which spatial channel #1 is multiplied by 9-point DFT-based orthogonal sequence #1 "$S_1$". Herein, "PR(n)" represents an $n^{th}$ sub-carrier signal of an existing downlink preamble sequence.

The AAS preamble can be expressed equivalently in a time domain as follows.

A signal "pr(m)" in a time domain obtained by applying the IFFT to an existing downlink preamble sequence PR(n) in a frequency domain is expressed as shown in Equation 4. Herein, the "pr(m)" represents an $m^{th}$ sub-carrier signal of an existing downlink preamble sequence in a time domain.

$$pr(m) = \frac{1}{N_{FFT}} \sum_{n=0}^{N_{FFT}-1} PR(n) e^{j\frac{2\pi nm}{N_{FFT}}} \quad \text{Equation 4}$$

Meanwhile, a time-domain signal "$pr_{AAS}^{(k)}(m)$" of a $k^{th}$ AAS preamble sequence "$PR_{AAS}^{(k)}(n)$" is expressed as shown in Equation 5. The $PR_{AAS}^{(k)}(n)$ and the $pr_{AAS}^{(k)}(m)$ are an equal signal expressed in a frequency domain and in a time domain, respectively.

$$pr_{AAS}^{(k)}(m) = \frac{1}{N_{FFT}} \sum_{n=0}^{N_{FFT}-1} PR_{AAS}^{(k)}(n) e^{j\frac{2\pi nm}{N_{FFT}}} \quad \text{Equation 5}$$

$$= \frac{1}{N_{FFT}} \sum_{n=0}^{N_{FFT}-1} PR(n) e^{j\frac{2\pi kn}{9}} e^{j\frac{2\pi nm}{N_{FFT}}}$$

$$= \frac{1}{N_{FFT}} \sum_{n=0}^{N_{FFT}-1} PR(n) e^{j\frac{2\pi n}{N_{FFT}}\left(m + \frac{k \cdot N_{FFT}}{9}\right)}$$

-continued $$= pr\left(m + \frac{k \cdot N_{FFT}}{9}\right)$$

An AAS preamble proposed according to the second embodiment of the present invention is equal to a sequence obtained by shifting an existing downlink preamble sequence by integer times of "$N_{FFT}/9$" along a time axis. Therefore, the AAS preamble can be obtained by shifting an existing downlink preamble sequence by integer times of "$N_{FFT}/9$" along the time axis, instead of multiplying the existing downlink preamble sequence by a DFT-based sequence in a frequency domain.

Figure 8:
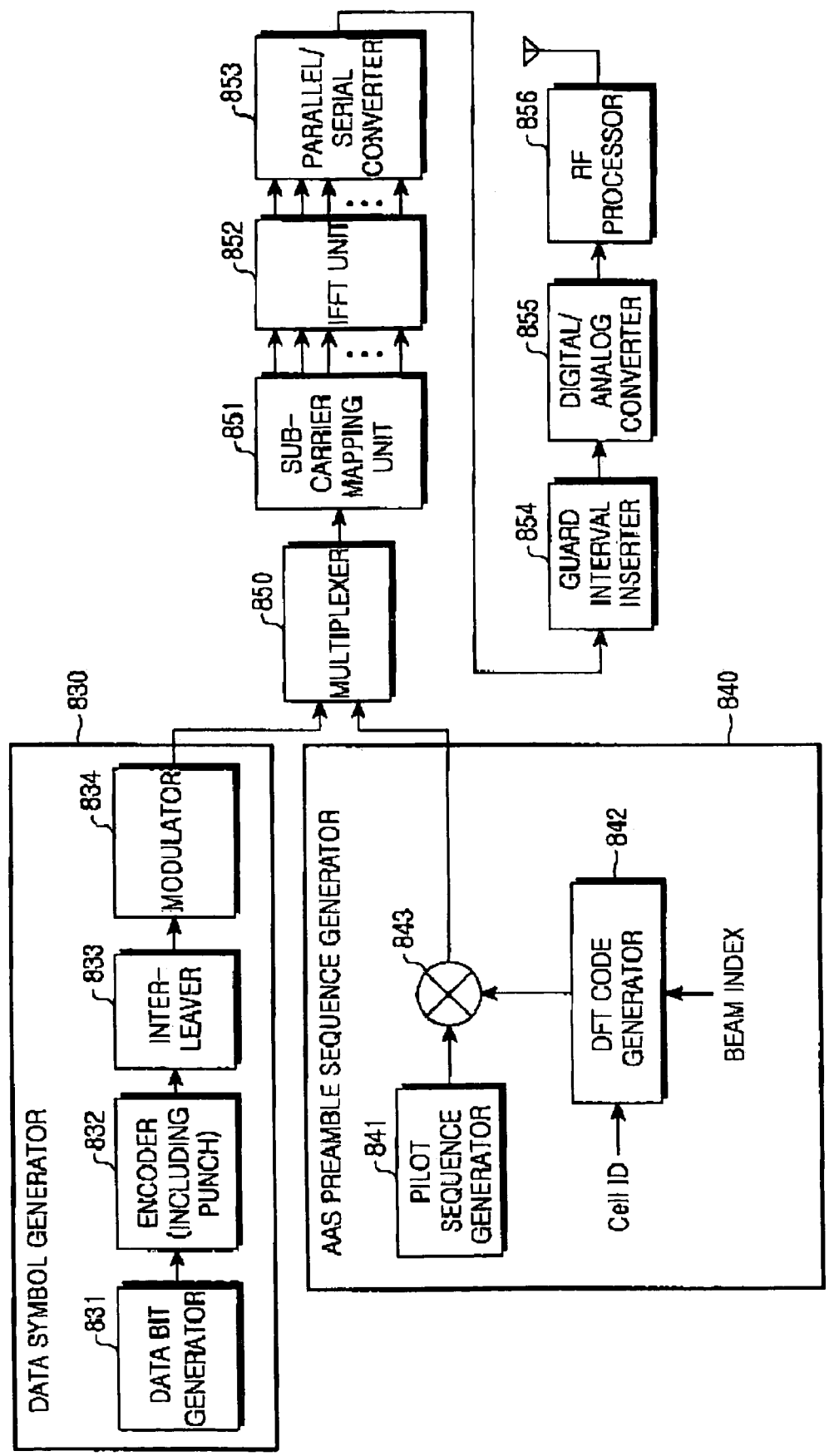
FIG. 8 is a block diagram illustrating the construction of a transmitter for performing an AAS preamble sequence generation function in the IEEE 802.16 communication system according to the second embodiment of the present invention.

FIG. 8 is a block diagram illustrating the construction of a transmitter for performing an AAS preamble sequence generation function in the IEEE 802.16e communication system according to the second embodiment of the present invention.

The transmitter includes a data symbol generator 830, an AAS preamble sequence generator 840, a multiplexer 850, a sub-carrier mapping unit 851, an IFFT unit 852, a parallel-to-serial converter 853, a guard interval inserter 854, a digital-to-analog converter 855, and an RF processor 856.

The data symbol generator 830 includes a data bit generator 831, an encoder 832, an interleaver 833, and a modulator 834. The AAS preamble sequence generator 840 includes a pilot sequence generator 841, a DFT code generator 842, and a multiplier 843.

First, when information bits to be transmitted are generated, the data bit generator 831 outputs the information bits to the encoder 832. The encoder 832 receives the information bits output from the data bit generator 831, encodes the received information bits according to a predetermined coding scheme, and then outputs the encoded information bits to the interleaver 833. Herein, the coding scheme includes a convolutional coding scheme and a turbo coding scheme having a predetermined coding rate, etc. The interleaver 833 receives the signal output from the encoder 832, performs an interleaving operation with respect to the received signal, and then outputs the interleaved signal to the modulator 834. The modulator 834 receives the signal output from the interleaver 833, modulates the received signal according to a predetermined modulating scheme to generate a modulated symbol, and then outputs the modulated symbol to the multiplexer 850.

Meanwhile, the pilot sequence generator 841 generates a pilot sequence corresponding to predetermined cell identifier and sector identifier, and then outputs the pilot sequence to the multiplier 843. Herein, the pilot sequence generator 841 operates to generate a pilot sequence in the same scheme as that described above, so detailed description thereof is omitted. The DFT code generator 842 generates a DFT code corresponding to a predetermined beam index, and then outputs the DFT code to the multiplier 843. The multiplier 843 multiplies the pilot sequence generated from the pilot sequence generator 841 by the DFT code output from the DFT code generator 842, and outputs a resultant signal to the multiplexer 850.

The multiplexer 850 multiplexes the signal output from the modulator 834 and the signal output from the multiplier 843 according to scheduling at each time point, and outputs the resultant signal to the sub-carrier mapping unit 851. The sub-carrier mapping unit 851 receives the signal output from the multiplexer 850, maps the received signal onto corresponding sub-carriers, and then outputs the resultant signal to the IFFT unit 852. The IFFT unit 852 receives the signal output from the sub-carrier mapping unit 851, performs the IFFT for the received signal, and then outputs the resultant signal to the parallel-to-serial converter 853. The parallel-to-serial converter 853 converts the signal output from the IFFT unit 852 into a serial signal and then outputs the serial signal to the guard interval inserter 854.

The guard interval inserter 854 inserts a guard interval signal into the serial signal output from the parallel-to-serial converter 853, and outputs the resultant signal to the digital-to-analog converter 855. Herein, the guard interval is inserted to remove interference between a previous OFDM symbol transmitted at a previous OFDM symbol time and a current OFDM symbol to be transmitted a current OFDM symbol time when an OFDM symbol is transmitted in the OFDM communication system. Also, the guard interval is inserted in one of a cyclic prefix scheme and a cyclic postfix scheme. According to the cyclic prefix scheme, a predetermined number of last samples of an OFDM symbol in a time domain are copied and inserted into a valid OFDM symbol. According to the cyclic postfix scheme, a predetermined number of first samples of an OFDM symbol in a time domain are copied and inserted into a valid OFDM symbol.

The digital-to-analog converter 855 receives the signal output from the guard interval inserter 854, converts the received signal into an analog signal, and then outputs the analog signal to the RF processor 856. Herein, the RF processor 856 includes a filter, a front-end unit, etc. The RF processor 856 RF-processes the analog signal output from the digital-to-analog converter 855 so that the signal can be transmitted over the air, and then outputs the RF-processed signal over the air via a transmission (Tx) antenna.

In short, a data bit is generated by the data symbol generator 830 and an AAS preamble sequence is generated by the AAS preamble sequence generator 840. In this case, the AAS preamble sequence is generated by multiplying a sequence, which is generated by the same scheme as the conventional preamble sequence generation scheme, by a 9-point DFT-based orthogonal code selected by a beam index. The data bit and AAS preamble sequence passes through the multiplexer 850, are mapped according to a sub-carrier assignment rule in the sub-carrier mapping unit 851, and then are OFDM-modulated to be transmitted.

Figure 9:
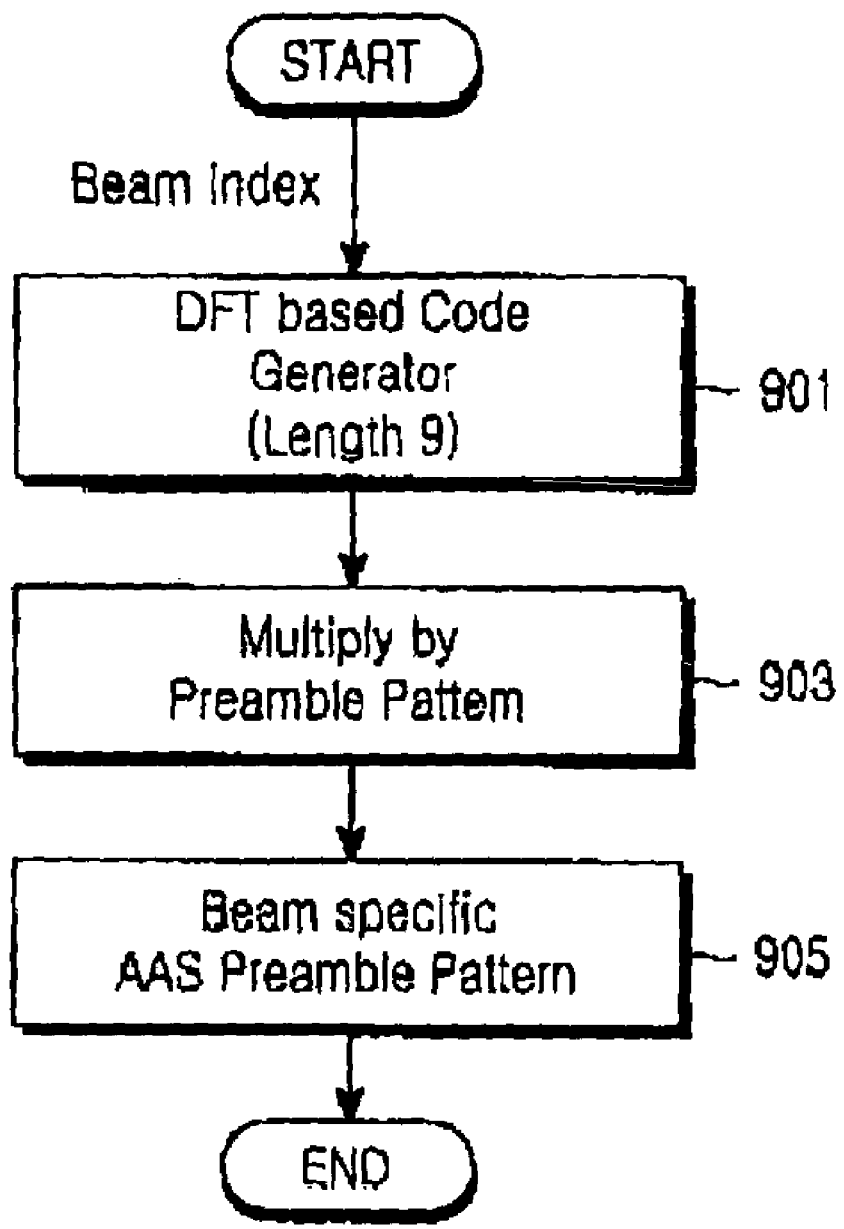
FIG. 9 is a flowchart illustrating a procedure for generating an AAS preamble sequence according to the second embodiment of the present invention.

FIG. 9 is a flowchart illustrating a procedure for generating an AAS preamble sequence in the AAS preamble sequence generator shown in FIG. 8 according to the second embodiment of the present invention.

First, the AAS preamble sequence generator 840 generates a 9-point DFT-based orthogonal code corresponding to a beam index according to a given spatial channel in step 901, and then proceeds to step 903. In step 903, an existing downlink preamble (i.e., data bit) is multiplied by the generated 9-point DFT-based orthogonal code, thereby generating an AAS preamble sequence. Thereafter, the data bit and the AAS preamble sequence passes through the multiplexer 850, are mapped according to a sub-carrier assignment rule in the sub-carrier mapping unit, and then are OFDM-modulated to be transmitted. According to the second embodiment of the present invention, all the sub-carriers in an AAS preamble carry a signal, differently from the first embodiment of the present invention in which only 8 subcarriers carry a signal.

As described above, according to the apparatus and the method for generating a preamble sequence for an adaptive antenna system (AAS) in an orthogonal frequency division multiple access communication system of the present invention, distinct preambles having orthogonal properties are assigned to different spatial channels in an OFDMA communication system using an AAS, so that a distinct beam can be formed for each of spatial channels. Since a distinct beam can be formed for each of spatial channels, it is possible to support a space division multiple access (SDMA). As a result, the same frequency resource and time resource can be reused. In addition, it is possible to increase cell capacity through the reuse of the same frequency resource and time resource.

While the present invention has been shown and described with reference to certain preferred embodiments thereof, it will be understood by those skilled in the art that various changes in form and detail may be made therein without departing from the spirit and scope of the invention as defined by the appended claims. Accordingly, the scope of the invention is not to be limited by the above embodiments but by the claims and the equivalents thereof.

What is claimed is:

1. A method for forming a preamble sequence in an Orthogonal Frequency Division Multiple Access (OFDMA) communication system supporting Spatial Division Multiple Access (SDMA) using at least one beam to create a spatial channel, the method comprising:

generating a preamble for an Adaptive Antenna System (AAS) by cyclically shifting a predetermined sequence in a time domain by k times of $N_{FFT}/9$; and transmitting the preamble, wherein k is a beam index for the AAS and $N_{FFT}$ is a Fast Fourier Transform (FFT) size, wherein the preamble occupies nine contiguous sub-carriers within an OFDMA symbol that make up a bin, wherein the cyclically-shifted sequence is used for each of a plurality of spatial channels to ensure orthogonality between different preambles in a frequency domain, wherein each sequence applied to a different preamble for a different beam is selected corresponding to a cell IDentifier (ID), and wherein the preamble sequence in the time domain is obtained by:

$$pr_{AAS}^{(k)}(m) = \frac{1}{N_{FFT}} \sum_{n=0}^{N_{FFT}-1} PR_{AAS}^{(k)}(n) e^{j\frac{2\pi nm}{N_{FFT}}}$$

$$= \frac{1}{N_{FFT}} \sum_{n=0}^{N_{FFT}-1} PR(n) e^{j\frac{2\pi kn}{9}} e^{j\frac{2\pi nm}{N_{FFT}}}$$

$$= \frac{1}{N_{FFT}} \sum_{n=0}^{N_{FFT}-1} PR(n) e^{j\frac{2\pi n}{N_{FFT}}\left(m + \frac{k \cdot N_{FFT}}{9}\right)}$$

$$= pr\left(m + \frac{k \cdot N_{FFT}}{9}\right),$$

wherein $pr_{AAS}^{(k)}(m)$ is a $k^{th}$ signal of the preamble sequence in the time domain, and $PR(n)$ is a $n^{th}$ sub-carrier signal of the preamble sequence.

2. An apparatus for forming a preamble sequence in an Orthogonal Frequency Division Multiple Access (OFDMA) communication system supporting Spatial Division Multiple Access (SDMA) using at least one beam to create a spatial channel, the apparatus comprising:

a preamble sequence generator for generating a preamble sequence for an Adaptive Antenna System (AAS) by cyclically shifting a predetermined sequence in a time domain by k times of $N_{FFT}/9$; and a transmitter for transmitting the preamble sequence, wherein k is a beam index for the AAS and $N_{FFT}$ is a Fast Fourier Transform (FFT) size, wherein the preamble occupies nine contiguous sub-carriers within an OFDMA symbol that make up a bin, wherein the cyclically-shifted sequence is used for each of a plurality of spatial channels to ensure orthogonality between different preambles in a frequency domain, wherein each sequence applied to a different preamble for a different beam is selected corresponding to a cell IDentifier (ID), and wherein the preamble sequence in the time domain is obtained by:

$$pr_{AAS}^{(k)}(m) = \frac{1}{N_{FFT}} \sum_{n=0}^{N_{FFT}-1} PR_{AAS}^{(k)}(n) e^{j\frac{2\pi nm}{N_{FFT}}}$$

$$= \frac{1}{N_{FFT}} \sum_{n=0}^{N_{FFT}-1} PR(n) e^{j\frac{2\pi kn}{9}} e^{j\frac{2\pi nm}{N_{FFT}}}$$

$$= \frac{1}{N_{FFT}} \sum_{n=0}^{N_{FFT}-1} PR(n) e^{j\frac{2\pi n}{N_{FFT}}\left(m + \frac{k \cdot N_{FFT}}{9}\right)}$$

$$= pr\left(m + \frac{k \cdot N_{FFT}}{9}\right),$$

wherein $pr_{AAS}^{(k)}(m)$ is a $k^{th}$ signal of the preamble sequence in the time domain, and $PR(n)$ is a $n^{th}$ sub-carrier signal of the preamble sequence.

3. The apparatus as claimed in claim 2, further comprising a plurality of sub-channels assigned to a plurality of mobile subscriber stations, wherein each of the sub-channels includes a plurality of bins, each of the bins including n contiguous subcarriers in a frequency domain.

* * * * *